United States Patent
Kim et al.

(10) Patent No.: US 10,863,545 B2
(45) Date of Patent: Dec. 8, 2020

(54) CHANNEL ACCESS METHOD IN WIRELESS LAN SYSTEM AND DEVICE THEREFOR

(71) Applicant: LG ELECTRONICS INC., Seoul (KR)

(72) Inventors: Jeongki Kim, Seoul (KR); Kiseon Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/476,257

(22) PCT Filed: Jan. 8, 2018

(86) PCT No.: PCT/KR2018/000340
§ 371 (c)(1),
(2) Date: Jul. 5, 2019

(87) PCT Pub. No.: WO2018/128497
PCT Pub. Date: Jul. 12, 2018

(65) Prior Publication Data
US 2019/0357256 A1    Nov. 21, 2019

Related U.S. Application Data

(60) Provisional application No. 62/443,808, filed on Jan. 8, 2017, provisional application No. 62/445,247, filed (Continued)

(51) Int. Cl.
*H04W 74/08*     (2009.01)
*H04W 48/16*     (2009.01)
(Continued)

(52) U.S. Cl.
CPC ....... *H04W 74/0816* (2013.01); *H04W 48/16* (2013.01); *H04W 72/0446* (2013.01); *H04W 74/002* (2013.01)

(58) Field of Classification Search
CPC . H04W 84/12; H04W 74/006; H04W 74/008; H04W 74/002; H04W 72/0446; H04W 48/16; H04W 74/0816
See application file for complete search history.

(56) References Cited

U.S. PATENT DOCUMENTS

2016/0050691 A1* 2/2016 Jauh ................ H04W 74/0808
                                                            370/252
2016/0374087 A1* 12/2016 Liu ...................... H04L 5/0007
(Continued)

FOREIGN PATENT DOCUMENTS

WO    2016161106    10/2016

OTHER PUBLICATIONS

PCT International Application No. PCT/KR2018/000340, Written Opinion of the International Searching Authority dated Apr. 13, 2018, 16 pages.

(Continued)

*Primary Examiner* — Benjamin H Elliott, IV
(74) *Attorney, Agent, or Firm* — Lee, Hong, Degerman, Kang & Waimey

(57) ABSTRACT

According to one embodiment of the present invention, a method by which a station (STA) performs channel access in a wireless LAN system comprises the steps of: receiving, from an access point (AP), a first frame indicating whether to deactivate a basic service set (BSS) color; receiving a second frame including a signal (SIG)-A field having a transmission opportunity (TXOP) period subfield and a BSS color subfield; and performing channel access, wherein the STA can perform the channel access by invoking an extended inter-frame space (EIFS) operation when the BSS color is deactivated by the first frame, but the BSS color subfield of the second frame includes the deactivated BSS color and the TXOP period subfield of the second frame includes a valid TXOP period value.

15 Claims, 20 Drawing Sheets

Related U.S. Application Data on Jan. 12, 2017, provisional application No. 62/445,259, filed on Jan. 12, 2017.

(51) Int. Cl.
*H04W 72/04* (2009.01)
*H04W 74/00* (2009.01)

(56) References Cited

U.S. PATENT DOCUMENTS

| | | | |
|---|---|---|---|
| 2017/0085461 A1* | 3/2017 | Zhou | H04L 45/02 |
| 2017/0094685 A1* | 3/2017 | Noh | H04W 72/042 |
| 2017/0257344 A1* | 9/2017 | Huang | H04L 61/6022 |
| 2017/0359300 A1* | 12/2017 | Patil | H04W 52/0212 |
| 2018/0014327 A1* | 1/2018 | Park | H04L 69/323 |
| 2018/0027573 A1* | 1/2018 | Cariou | H04W 72/085 |
| | | | 370/329 |
| 2018/0110046 A1* | 4/2018 | Patil | H04W 74/006 |
| 2019/0246423 A1* | 8/2019 | Alpert | H04W 24/10 |
| 2019/0357256 A1* | 11/2019 | Kim | H04W 74/0816 |

OTHER PUBLICATIONS

Patil, A. et al., "Proposed Resolution for CID 193 (BSS Color Disable Indication)", IEEE P802.11 Wireless LANs, doc.: IEEE 802.11-16/1413r8, Nov. 2016, 6 pages.

Asterjadhi, A., "EIFS", IEEE P802.11 Wireless LANs, doc.: IEEE 802.11-16/xxxxr00, Jul. 2016, 5 pages.

* cited by examiner (a) Trigger frame (b) Common Info field of Trigger frame (c) User Info field of Trigger frame

FIG. 18

| AID 11 | Reserved | RU Allocation | Coding Type | MCS | DCM | SS Allocation | Target RSSI | Reserved | Trigger dependent User Info |
|---|---|---|---|---|---|---|---|---|---|
| Bits: 11 | 1 | 8 | 1 | 4 | 1 | 6 | 7 | 1 | Variable |

CHANNEL ACCESS METHOD IN WIRELESS LAN SYSTEM AND DEVICE THEREFOR

CROSS-REFERENCE TO RELATED APPLICATIONS

This application is the National Stage filing under 35 U.S.C. 371 of International Application No. PCT/KR2018/000340, filed on Jan. 8, 2018, which claims the benefit of U.S. Provisional Application No. 62/443,808, filed on Jan. 8, 2017, 62/445,247, filed on Jan. 12, 2017, and 62/445,259, filed on Jan. 12, 2017, the contents of which are all hereby incorporated by reference herein in their entirety.

TECHNICAL FIELD

The present disclosure relates to channel access in a wireless local area network (WLAN) system, and more particularly, to a channel access method based on extended inter-frame space (EIFS) and device therefor.

BACKGROUND ART

Standards for Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbit/s for 8 spatial streams and IEEE 802.11ax standards are under discussion.

DISCLOSURE

Technical Problem

The object of the present disclosure is to provide a method of performing channel access efficiently and accurately in an environment where basic service set (BSS) color is disabled and device therefor.

The objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of performing channel access by a station (STA) in a wireless local area network (WLAN) system. The method may include receiving, from an access point (AP), a first frame indicating whether basic service set (BSS) color is disabled, receiving a second frame including a Signal-A (SIG-A) field having a Transmission Opportunity (TXOP) Duration subfield and a BSS Color subfield, and performing the channel access. If the BSS Color subfield of the second frame includes a disabled BSS color and the TXOP Duration subfield of the second frame includes a valid TXOP duration value even though the first subframe indicates that the BSS color is disabled, the STA may perform the channel access by invoking an extended inter-frame space (EIFS) operation.

In another aspect of the present disclosure, provided herein is a station (STA). The STA may include a transceiver and a processor configured to control the transceiver to receive, from an access point (AP), a first frame indicating whether basic service set (BSS) color is disabled, receive a second frame including a Signal-A (SIG-A) field having a Transmission Opportunity (TXOP) Duration subfield and a BSS Color subfield, and perform channel access. If the BSS Color subfield of the second frame includes a disabled BSS color and the TXOP Duration subfield of the second frame includes a valid TXOP duration value even though the first subframe indicates that the BSS color is disabled, the STA may perform the channel access by invoking an extended inter-frame space (EIFS) operation.

When the STA is unable to obtain medium access control (MAC) data from the second frame including the disabled BSS color and the valid TXOP duration value, the STA may invoke the EIFS operation.

The STA may not update a network allocation vector (NAV) with the valid TXOP duration value by ignoring the valid TXOP duration value of the second frame including the disabled BSS color.

When the BSS color is disabled, the STA may include an invalid TXOP duration value in a frame transmitted by the STA.

When the BSS Color subfield of the second frame corresponds to an inter-BSS frame including another BSS color, the STA may not invoke the EIFS by reason that the second frame includes the valid TXOP duration value.

When the STA receives a third frame including another valid TXOP duration value during the EIFS operation, the STA may terminate the EIFS operation and resynchronize with an actual busy/idle state of a medium.

At the termination of the EIFS operation, the STA may revert to either or both an intra-BSS network allocation vector (NAV) and a basic NAV.

If the third frame is an inter-BSS frame, the STA may terminate the EIFS operation and revert to the basic NAV.

If the third frame is an intra-BSS frame, the STA may continue the EIFS operation.

Advantageous Effects

According to embodiments of the present disclosure, if an STA receives an intra-BSS frame including a valid TXOP duration value when BSS color is disabled, the STA may not only ignore the corresponding TXOP duration value to avoid a NAV from being updated with an incorrect frame but may also perform channel access by invoking the EIFS operation, thereby protecting a TXOP holder/responder.

The effects that can be achieved through the present disclosure are not limited to what has been particularly described hereinabove and other advantages of the present disclosure will be more clearly understood from the following detailed description.

DESCRIPTION OF DRAWINGS

FIG. 18 illustrates a User Information field of a trigger frame;

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention.

As described before, the following description is given of a method and apparatus for increasing a spatial reuse rate in a Wireless Local Area Network (WLAN) system. To do so, a WLAN system to which the present invention is applied will first be described in detail.

Figure 1:
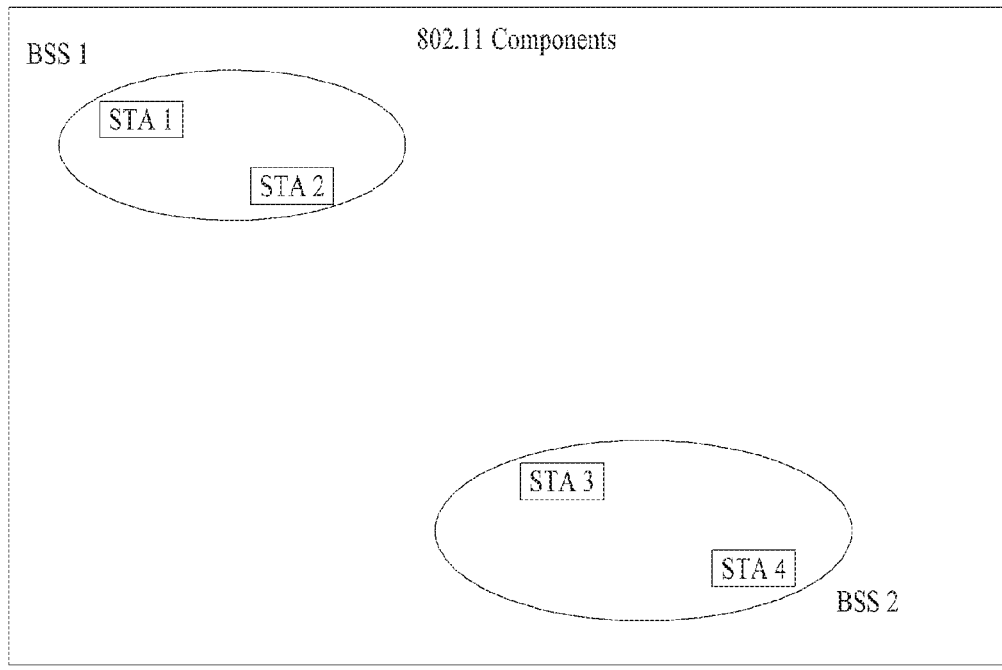
FIG. 1 illustrates an example of a configuration of a wireless LAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
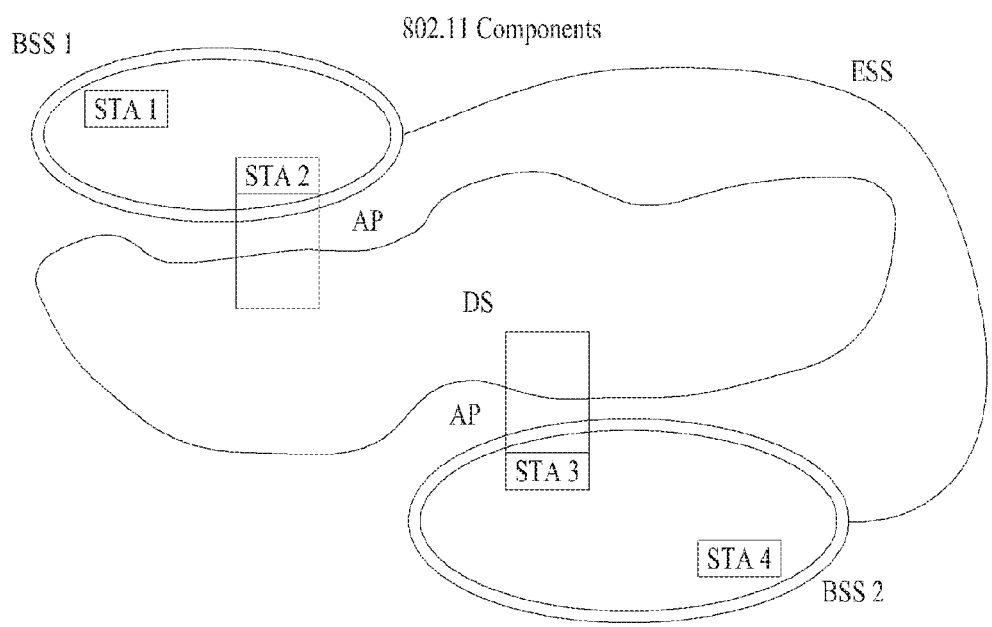
FIG. 2 illustrates another example of a configuration of a wireless LAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Architecture

An operation of an STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MLME-PLME_SAP.

Link Setup Process

Figure 3:
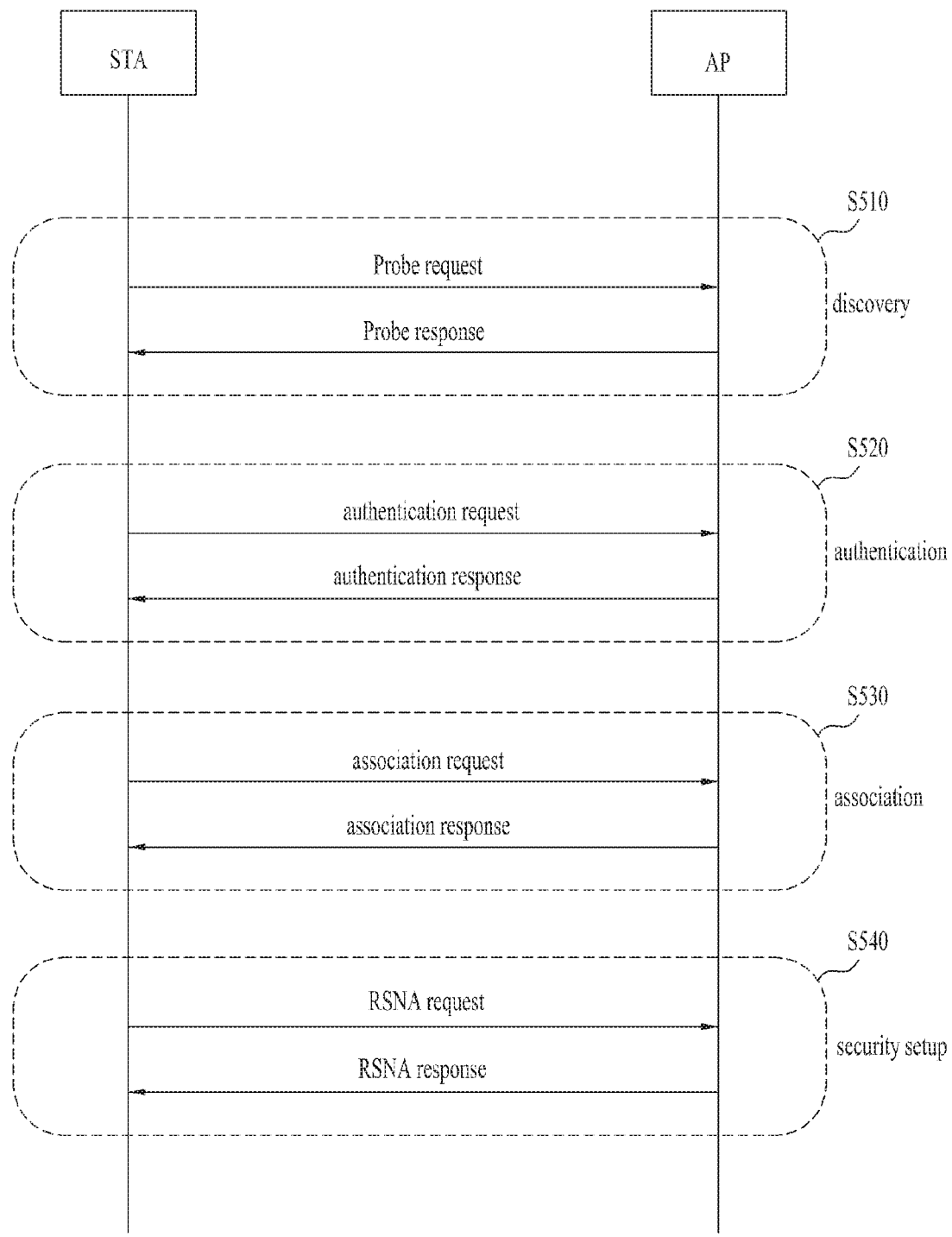
FIG. 3 illustrates a general link setup procedure.

FIG. 3 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 3.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 3 is a flowchart illustrating a network discovery action including an active scanning process. In the case of the active scanning, an STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 3, the scanning action may also be carried out using passive scanning. AN STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

Medium Access Mechanism

In the IEEE 802.11—based WLAN system, a basic access mechanism of Medium Access Control (MAC) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 4:
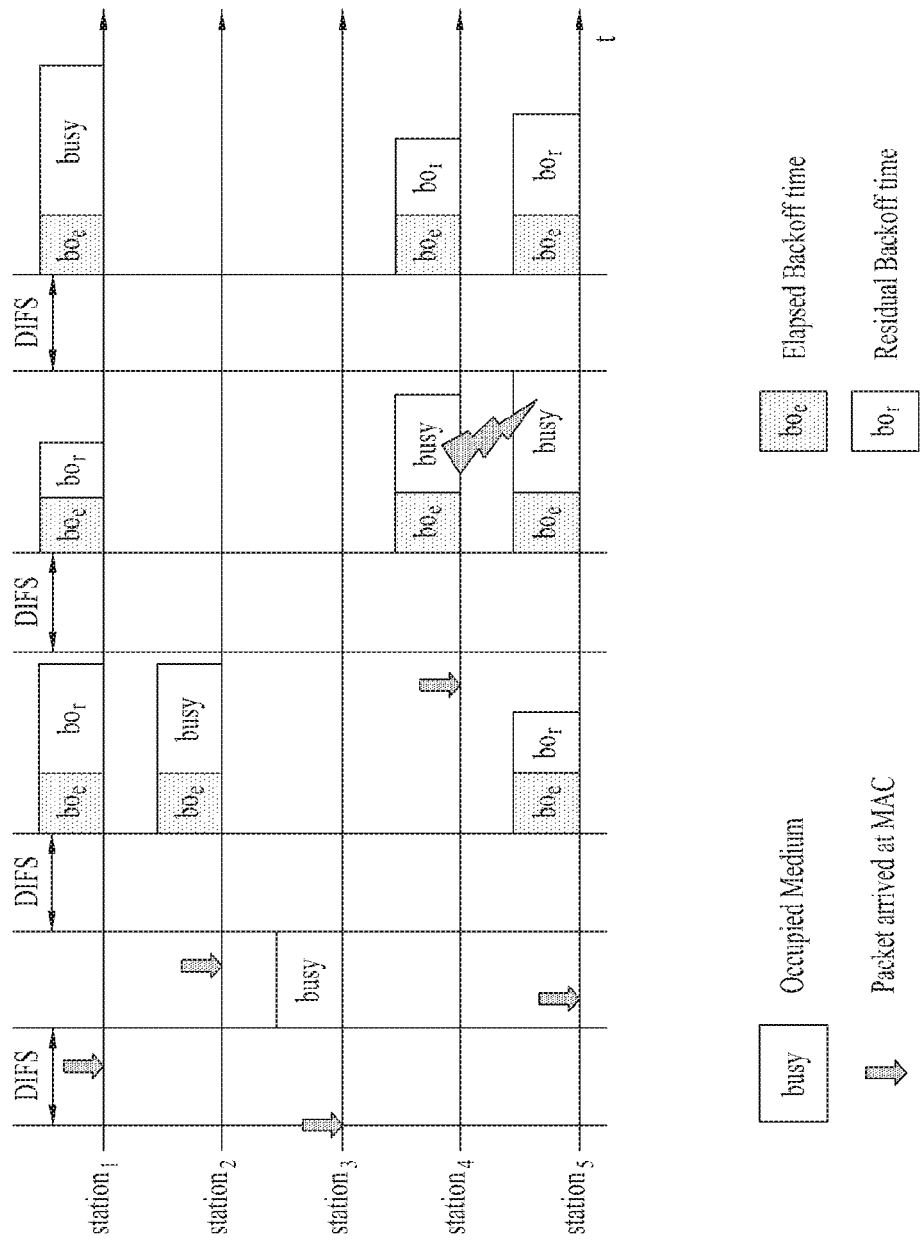
FIG. 4 illustrates a backoff procedure.

FIG. 4 is a conceptual diagram illustrating a backoff process.

Operations based on a random backoff period will hereinafter be described with reference to FIG. 4. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count has a value of a Packet Number (PN), and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin Preferably, CW, CWmin, and CWmax are set to $2n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 4, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 4 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 4 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. AN STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 5:
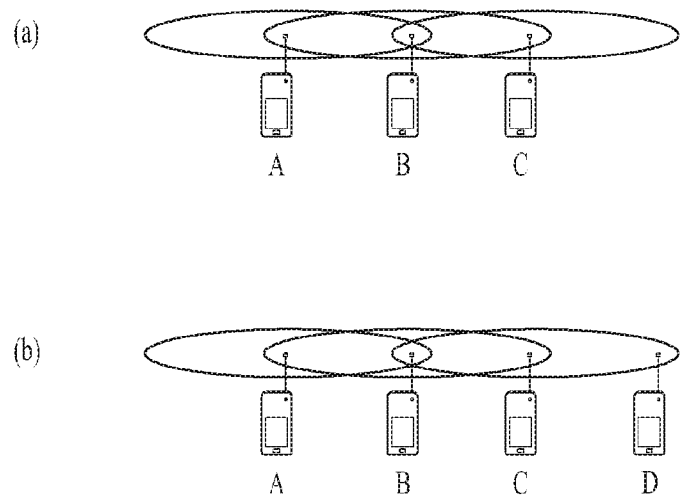
FIG. 5 is an explanatory diagram of a hidden node and an exposed node.

FIG. 5 is a conceptual diagram illustrating a hidden node and an exposed node.

FIG. 5(*a*) exemplarily shows the hidden node. In FIG. 5(*a*), STA A communicates with STA B, and STA C has information to be transmitted. In FIG. 5(*a*), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 5(*b*) exemplarily shows an exposed node. In FIG. 5(*b*), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 6:
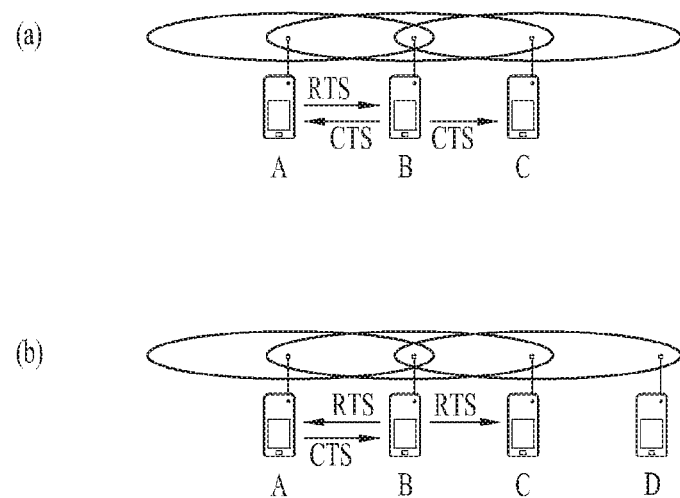
FIG. 6 is an explanatory diagram of RTS and CTS.

FIG. 6 is a conceptual diagram illustrating Request To Send (RTS) and Clear To Send (CTS).

In order to efficiently utilize the collision avoidance mechanism under the above-mentioned situation of FIG. 5, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 6(*a*) exemplarily shows the method for solving problems of the hidden node. In FIG. 6(*a*), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 6(*b*) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Power Management

As described above, the WLAN system has to perform channel sensing before STA performs data transmission/reception. The operation of always sensing the channel causes persistent power consumption of the STA. There is not much difference in power consumption between the Reception (Rx) state and the Transmission (Tx) state. Continuous maintenance of the Rx state may cause large load to a power-limited STA (i.e., STA operated by a battery). Therefore, if STA maintains the Rx standby mode so as to persistently sense the channel, power is inefficiently consumed without special advantages in terms of WLAN throughput. In order to solve the above-mentioned problem, the WLAN system supports a Power Management (PM) mode of the STA.

The PM mode of the STA is classified into an active mode and a Power Save (PS) mode. The STA is basically operated in the active mode. The STA operating in the active mode maintains an awake state. If the STA is in the awake state, the STA may normally operate such that it can perform frame transmission/reception, channel scanning, or the like. On the other hand, STA operating in the PS mode is configured to switch from the doze state to the awake state or vice versa. STA operating in the sleep state is operated with minimum power, and the STA does not perform frame transmission/reception and channel scanning.

The amount of power consumption is reduced in proportion to a specific time in which the STA stays in the sleep state, such that the STA operation time is increased in response to the reduced power consumption. However, it is impossible to transmit or receive the frame in the sleep state, such that the STA cannot mandatorily operate for a long period of time. If there is a frame to be transmitted to the AP, the STA operating in the sleep state is switched to the awake state, such that it can transmit/receive the frame in the awake state. On the other hand, if the AP has a frame to be transmitted to the STA, the sleep-state STA is unable to receive the frame and cannot recognize the presence of a frame to be received. Accordingly, STA may need to switch to the awake state according to a specific period in order to recognize the presence or absence of a frame to be transmitted to the STA (or in order to receive a signal indicating the presence of the frame on the assumption that the presence of the frame to be transmitted to the STA is decided).

The AP may transmit a beacon frame to STAs in a BSS at predetermined intervals. The beacon frame may include a traffic indication map (TIM) information element. The TIM information element may include information indicating that the AP has buffered traffic for STAs associated therewith and will transmit frames. TIM elements include a TIM used to indicate a unicast frame and a delivery traffic indication map (DTIM) used to indicate a multicast or broadcast frame.

Figure 7:
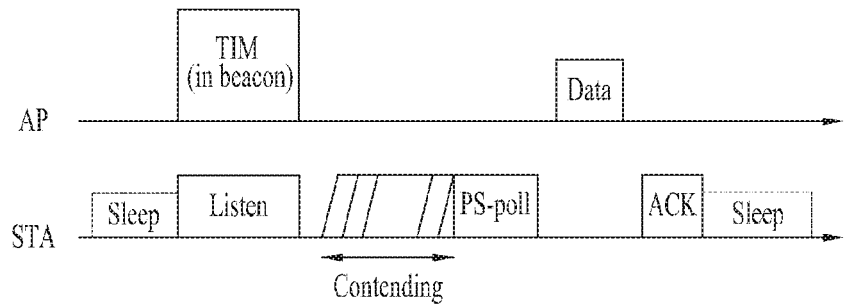
FIGS. 7 to 9 are explanatory diagrams of operation of an STA that has received TIM.
Figure 8:
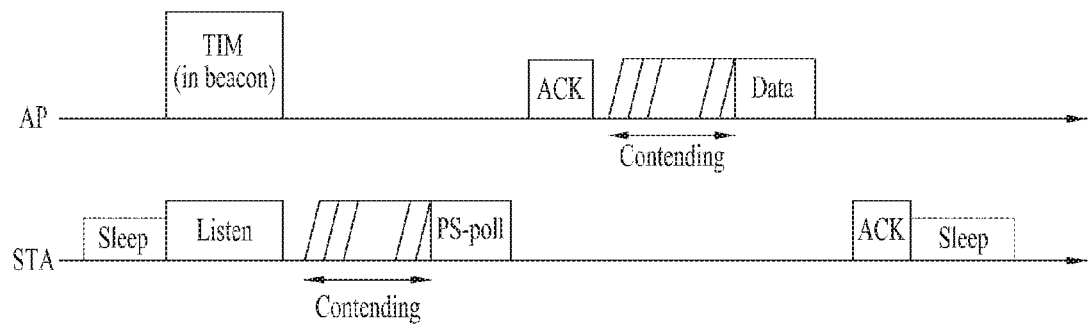
Figure 9:
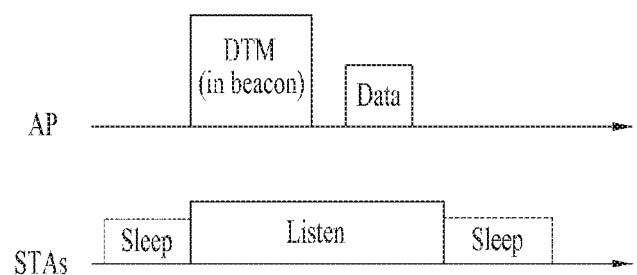

FIGS. 7 to 9 are conceptual diagrams illustrating detailed operations of the STA having received a Traffic Indication Map (TIM).

Referring to FIG. 7, STA is switched from the sleep state to the awake state so as to receive the beacon frame including a TIM from the AP. STA interprets the received TIM element such that it can recognize the presence or absence of buffered traffic to be transmitted to the STA. After STA contends with other STAs to access the medium for PS-Poll frame transmission, the STA may transmit the PS-Poll frame for requesting data frame transmission to the AP. The AP having received the PS-Poll frame transmitted by the STA may transmit the frame to the STA. STA may receive a data frame and then transmit an ACK frame to the AP in response to the received data frame. Thereafter, the STA may re-enter the sleep state.

As can be seen from FIG. 7, the AP may operate according to the immediate response scheme, such that the AP receives the PS-Poll frame from the STA and transmits the data frame after lapse of a predetermined time [for example, Short Inter-Frame Space (SIFS)]. In contrast, the AP having received the PS-Poll frame does not prepare a data frame to be transmitted to the STA during the SIFS time, such that the AP may operate according to the deferred response scheme, and as such a detailed description thereof will hereinafter be described with reference to FIG. 8.

The STA operations of FIG. 8 in which the STA is switched from the sleep state to the awake state, receives a TIM from the AP, and transmits the PS-Poll frame to the AP through contention are identical to those of FIG. 7. If the AP having received the PS-Poll frame does not prepare a data frame during the SIFS time, the AP may transmit the ACK frame to the STA instead of transmitting the data frame. If the data frame is prepared after transmission of the ACK frame, the AP may transmit the data frame to the STA after completion of such contending. STA may transmit the ACK frame indicating successful reception of a data frame to the AP, and may be shifted to the sleep state.

FIG. 9 shows the exemplary case in which AP transmits DTIM. STAs may be switched from the sleep state to the awake state so as to receive the beacon frame including a DTIM element from the AP. STAs may recognize that multicast/broadcast frame(s) will be transmitted through the received DTIM. After transmission of the beacon frame including the DTIM, AP may directly transmit data (i.e., multicast/broadcast frame) without transmitting/receiving the PS-Poll frame. While STAs continuously maintains the awake state after reception of the beacon frame including the DTIM, the STAs may receive data, and then switch to the sleep state after completion of data reception.

Frame Structure

Figure 10:
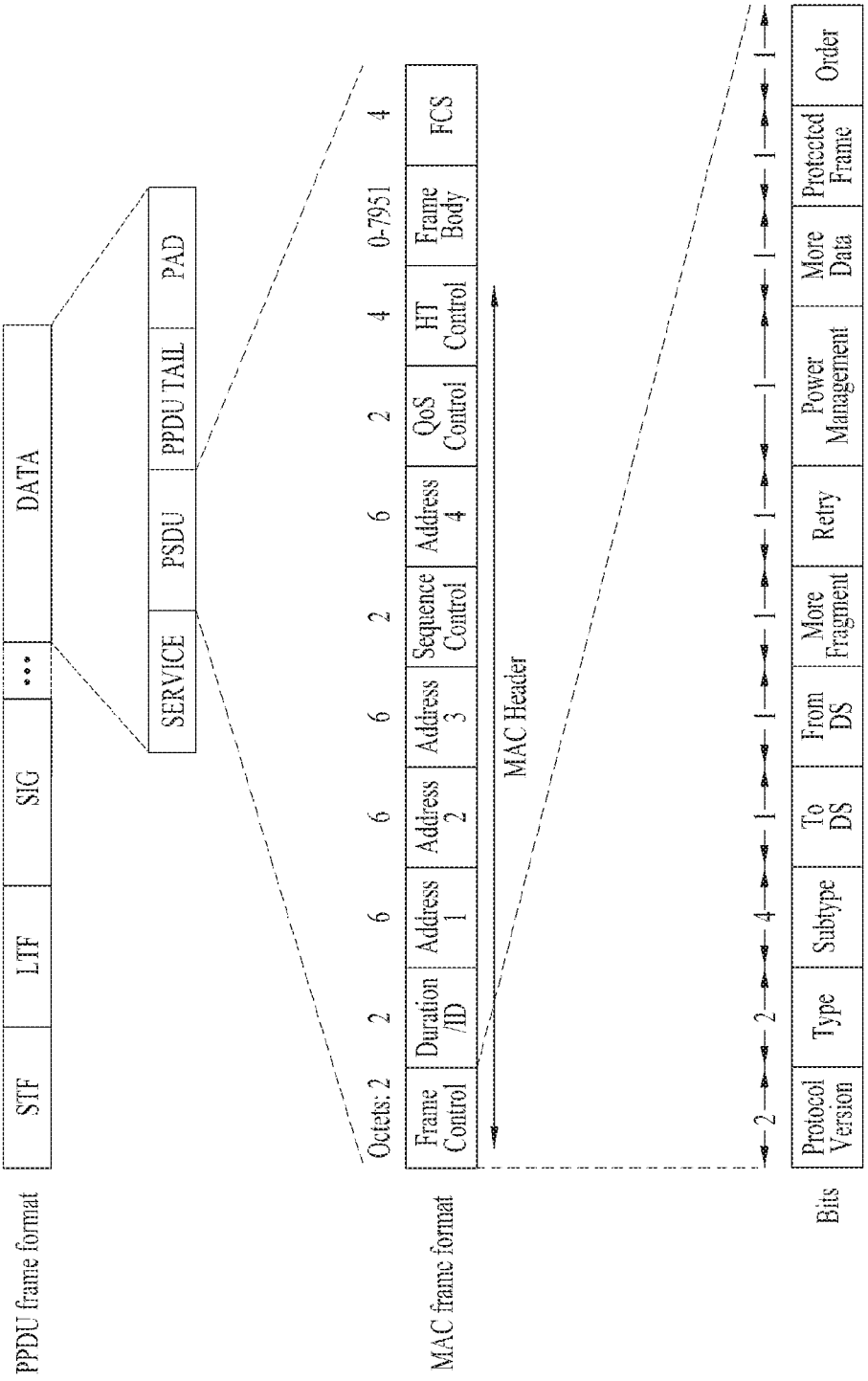
FIG. 10 is an explanatory diagram of an exemplary frame structure used in an IEEE 802.11 system.

FIG. 10 is an explanatory diagram of an exemplary frame structure used in an IEEE 802.11 system.

A PPDU (Physical Layer Protocol Data Unit) frame format may include an STF (Short Training Field), an LTF (Long Training Field), a SIG (SIGNAL) field and a data field. The most basic (e.g., non-HT (High Throughput)) PPDU frame format may include only an L-STF (Legacy-STF), an L-LTF (Legacy-LTF), a SIG field and a data field.

The STF is a signal for signal detection, AGC (Automatic Gain Control), diversity selection, accurate time synchronization, etc., and the LTF is a signal for channel estimation, frequency error estimation, etc. The STF and LTF may be collectively called a PLCP preamble. The PLCP preamble may be regarded as a signal for OFDM physical layer synchronization and channel estimation.

The SIG field may include a RATE field and a LENGTH field. The RATE field may include information about modulation and coding rates of data. The LENGTH field may include information about the length of data. In addition, the SIG field may include a parity bit, a SIG TAIL bit, etc.

The data field may include a SERVICE field, a PSDU (Physical layer Service Data Unit) and a PPDU TAIL bit. The data field may also include padding bits as necessary. Some bits of the SERVICE field may be used for synchronization of a descrambler at a receiving end. The PSDU corresponds to an MPDU (MAC Protocol Data Unit) defined in the MAC layer and may include data generated/used in a higher layer. The PPDU TAIL bit may be used to return an encoder to state 0. The padding bits may be used to adjust the length of the data field to a predetermined unit.

The MPDU is defined depending on various MAC frame formats, and a basic MAC frame includes a MAC header, a frame body and an FCS (Frame Check Sequence). The MAC frame may be composed of the MPDU and transmitted/received through PSDU of a data part of the PPDU frame format.

The MAC header includes a frame control field, a duration/ID field, an address field, etc. The frame control field may include control information necessary for frame transmission/reception. The duration/ID field may be set to a time to transmit a relevant a relevant frame.

The duration/ID field included in the MAC header may be set to a 16-bit length (e.g., B0 to B15). Content included in the duration/ID field may depend on frame type and sub-type, whether transmission is performed for a CFP (contention free period), QoS capability of a transmission STA and the like. (i) In a control frame corresponding to a sub-type of PS-Poll, the duration/ID field may include the AID of the transmission STA (e.g., through 14 LSBs) and 2 MSBs may be set to 1. (ii) In frames transmitted by a PC (point coordinator) or a non-QoS STA for a CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined per frame type. For example, B15=0 of the duration/ID field indicates that the duration/ID field is used to indicate a TXOP duration, and B0 to B14 may be used to indicate an actual TXOP duration. The actual TXOP duration indicated by B0 to B14 may be one of 0 to 32767 and the unit thereof may be microseconds (μs). However, when the duration/ID field indicates a fixed TXOP duration value (e.g., 32768), B15 can be set to 1 and B0 to B14 can be set to 0. When B14=1 and B15=1, the duration/ID field is used to indicate an AID, and B0 to B13 indicate one AID of 1 to 2007. Refer to the IEEE 802.11 standard document for details of Sequence Control, QoS Control, and HT Control subfields of the MAC header.

The frame control field of the MAC header may include Protocol Version, Type, Subtype, To DS, From DS, More Fragment, Retry, Power Management, More Data, Protected Frame and Order subfields. Refer to the IEEE 802.11 standard document for contents of the subfields of the frame control field.

Figure 11:
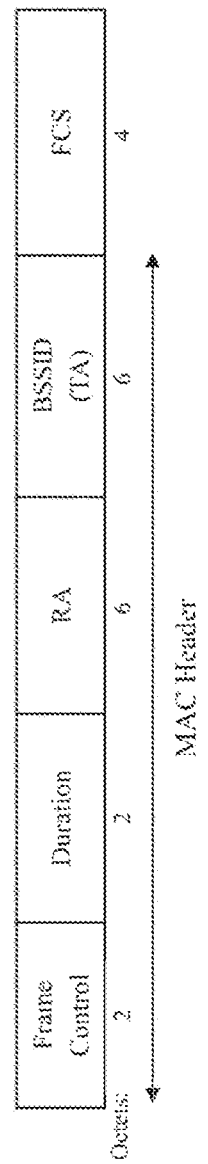
FIG. 11 illustrates a contention free (CF)-END frame.
Figure 12:
FIGS. 12 to 15 illustrate HE PPDUs.
Figure 13:
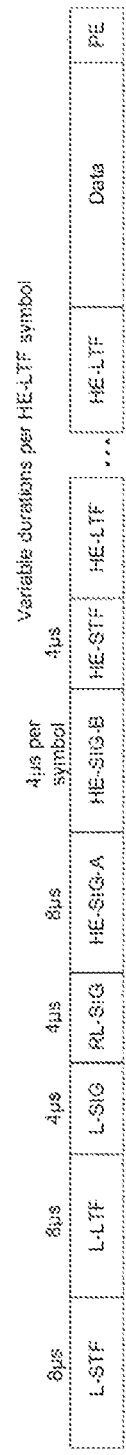
Figure 14:
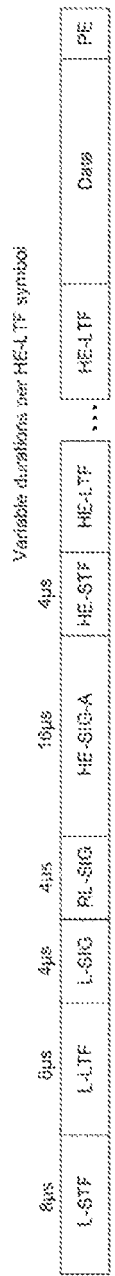
Figure 15:
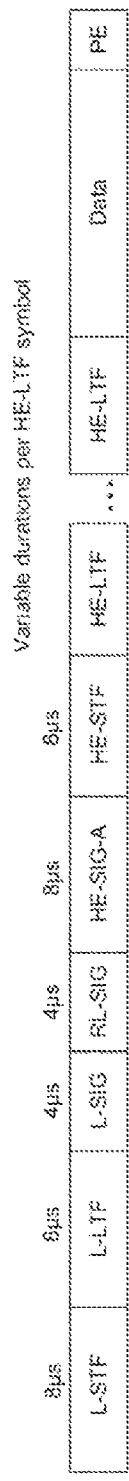

FIG. 11 illustrates a CF (contention free)-END frame.

It is assumed that the CF-END frame is transmitted by a non-DMG (directional multi-gigabit, 11ad) STA for convenience of description. The CF-END frame may be transmitted to truncate a TXOP duration. Accordingly, a duration field is set to 0 in the CF-END frame. An RA (Receiver Address) field may be set to a broadcast group address. A BSSID field may be set to an STA address included in a relevant AP. However, in the case of a CF-END frame in a non-HT or non-HT duplicate format, which is transmitted from a VHT STA to a VHT AP, an Individual/Group bit of the BSSID field may be set to 1.

Example of HE PPDU Structure

A description will be given of examples of a HE PPDU (High Efficiency Physical layer Protocol Data Unit) format in a wireless LAN system supporting 11ax.

FIGS. 12 to 15 illustrate HE PPDUs.

A HE-SIG A field is positioned after L-part (L-STF, L-LTF, and L-SIG). Similar to the L-part, the HE-SIG A field is repeated (duplicated) in a unit of 20 MHz. The HE-SIG A can be included in all HE PPDUs. On the contrary, HE SIG B can be omitted from an SU PPDU or a UL trigger-based PPDU (e.g., a UL PPDU transmitted based on a trigger frame).

The HE-SIG A includes common control information (e.g., BW, GI length, BSS color, CRC, Tail, etc.) on STAs. The HE-SIG A field includes information for interpreting HE PPDU. Hence, information included in the HE-SIG A field may vary depending on a format of HE PPDU (e.g., SU PPDU, MU PPDU, or trigger-based PPDU).

For example, (i) in case of the HE SU PPDU format, the HE-SIG A field can include at least one selected from the group consisting of a DL/DL indicator, a HE PPDU format indicator, BSS color, TXOP duration, BW (bandwidth), MCS, CP+LTF length, coding information, number of streams, STBC (e.g., whether or not STBC is used), transmission beamforming (TxBF) information, CRC, and Tail. In case of the HE SU PPDU format, HE-SIG B field can be omitted. (ii) In case of the HE MU PPDU format, the HE-SIG A field can include at least one selected from the group consisting of a DL/UL indicator, BSS color, TCOP duration, BW (bandwidth), MCS information of SIG B field, number of symbols of the SIG B field, HE LTF symbol number, an indicator indicating whether or not full band MU-MIMO is used, CP+LTF length, transmission beamforming (TxBF) information, CRC, and Tail. (iii) In case of HE trigger-based PPDU format, the HE-SIG A field can include at least one selected from the group consisting of a format indicator (e.g., indicating SU PPDU or trigger-based PPDU), BSS color, TXOP duration, BW, CRC, and Tail.

The HE SIG-A includes not only the common control information but also user allocation information (e.g., at least one selected from the group consisting of an STA identifier such as PAID, GID, and the like, information on allocated resource, and number of streams (Nsts)).

The BSS color information included in the HE-SIG A field corresponds to information for identifying BSS and has a length shorter than a length of a BSSID. For example, a BSSID has a length of 48 bits, whereas the BSS color information may have a length of 6 bits. An STA can determine whether or not a frame corresponds to an intra-BSS frame using the BSS color information. In particular, if the HE-SIG A field is decoded only, the STA can distinguish an intra BSS PPDU from an inter BSS PPDU via the BSS color information without decoding the whole of HE PPDU.

The HE-SIG B can be independently encoded in every 20 MHz channel unit. If the HE-SIG B is encoded in every 20 MHz channel unit, the HE-SIG B can be referred to as a HE-SIG B content channel.

According to one embodiment, if a bandwidth is not wider than 20 MHz, it may be able to transmit a single HE-SIG B content channel. If a bandwidth is wider than 20 MHz, channels of a size of 20 MHz may transmit either a first HE-SIG B content channel (hereinafter, HE-SIG B [1]) or a second HE-SIG B content channel (hereinafter, HE-SIG B [2]). For example, the HE-SIG B [1] and the HE-SIG B [2] can be transmitted in turn. An odd-numbered 20 MHz channel transmits the HE-SIG B [1] and an even-numbered 20 MHz channel transmits the HE-SIG B [2]. More specifically, in case of a 40 MHz bandwidth, the HE-SIG B [1] is transmitted on a first 20 MHz channel and the HE-SIG B [2] is transmitted on a second 20 MHz channel. In case of an 80 MHz bandwidth, the HE-SIG B [1] is transmitted on a first 20 MHz channel, the HE-SIG B [2] is transmitted on a second 20 MHz channel, the identical HE-SIG B [1] is repeatedly transmitted on a third 20 MHz channel, and the identical HE-SIG B [2] is repeatedly transmitted on a fourth 20 MHz channel. The HE-SIG B [1] and the HE-SIG B [2] are similarly transmitted on a 160 MHz bandwidth.

Meanwhile, content of the HE-SIG B [1] may differ from content of the HE-SIG B [2]. Yet, all of the HE-SIG B [1] have the same content. Similarly, all of the HE-SIG B [2] have the same content.

The HE-SIG B can include a common field and a user-specific field. The common field may appear prior to the user-specific field. The common field and the user-specific field can be distinguished from each other in a bit unit rather than an OFDM symbol unit.

The common field of the HE-SIG B includes information on all STAs configured to receive PPDU on a corresponding bandwidth. The common field can include RU (resource unit) allocation information. For example, when four 20 MHz-channels constructing 80 MHz are respectively designated as [LL, LR, RL, RR], a common block for LL and RL is included in the common field of the HE-SIG B [1] and a common block for LR and RR can be included in the common field of the HE-SIG B [2].

The user-specific field of the HE-SIG B can include a plurality of user fields. Each of a plurality of the user fields can include information on a specific STA configured to receive PPDU. For example, a user field can include at least one selected from the group consisting of a station ID, MCS per STA, stream number 9Nsts), coding (e.g., LDPC use indication), a DCM indicator, and transmission beamforming information, by which the present invention may be non-limited.

Trigger Frame

Figures 16, 17:
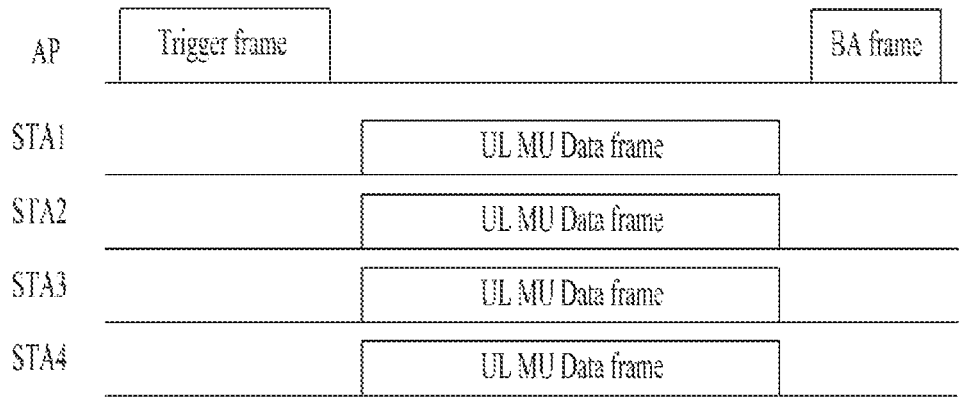
FIG. 16 is an explanatory diagram of uplink multi-user transmission based on a trigger frame.
FIG. 17 illustrates a trigger frame format.

FIG. 16 is a diagram illustrating uplink multi-user transmission based on a trigger frame.

As described above, an 802.11ax system may employ uplink (UL) multi-user (MU) transmission. The UL MU transmission may be started when an AP transmits a trigger frame to a plurality of STAs (e.g., STA1 to STA4) as illustrated in FIG. 16. The AP may obtain a TXOP for transmitting the trigger frame from contention for medium access.

The trigger frame may include UL MU allocation information. For example, the UL MU allocation information may include at least one of resource locations and sizes, STA IDs or reception STA addresses, and MCSs and MU types (MIMO, OFDMA, etc.). The content of the trigger frame will be described in detail later.

The STAs may transmit a UL data frame using a HE trigger based PPDU format after SIFS from a PPDU including the trigger frame.

The AP may transmit an ACK for a UL MU data frame in a block ACK (BA) frame.

FIG. 17 illustrates a trigger frame format according to an embodiment of the present disclosure. Specifically, FIG. 17 (a) shows the entirety of a trigger frame, FIG. 17 (b) shows a Common Information field of the trigger frame, and FIG. 17 (c) shows a User Information field of the trigger frame.

Referring to FIG. 17 (a), the trigger frame may include at least one of a Frame Control field, a Duration field, a Recipient STA Address (RA) field, a Transmitting STA Address (TA) field, a Common Information field, one or more Per User Information (Info) fields, a Padding field, and a Frame Check Sequence (FCS) field. The RA field indicates the address or ID of a recipient STA and may be omitted in some embodiments. The TA field indicates the address of a transmitting STA.

Referring to FIG. 17 (b), the Common Information field may include at least one of the following subfields: Trigger Type, Length, Cascade Indication, Carrier Sensing (CS) Required, Bandwidth (BW), Guard Interval (GI) and Long Training Field (LTF) Type, MU-MIMO LTF Mode, Number of HE-LTF Symbols, STBC, LDPC Extra Symbol Segment, AP Tx Power, Packet Extension, Spatial Reuse, Doppler, HE-SIG-A Information, Reserved, and Trigger-Dependent Common Information. The Trigger Type subfield indicates the type of the trigger frame. For example, the trigger type may be set to one of Basic Trigger type (e.g., type 0), Beamforming Report Poll Trigger type (e.g., type 1), MU-BAR (multi-user block ACK request) type (e.g., type 2) and MU-RTS (multi-user ready to send) type (e.g., type 3), Buffer State Report Poll type (e.g., type 4), GCR MU BAR type (e.g., type 5), and BW Query Report Pool type. However, the present disclosure is not limited thereto. The Length subfield indicates the L-SIG length of a HE trigger based PPDU (e.g., UL MU PPDU). The Cascade Indication subfield indicates whether there is transmission of a trigger frame after the current trigger frame. The CS Required subfield indicates whether a correcting STA should respond by considering a medium sensing result and a NAV. The BW subfield indicates a bandwidth in HE SIG-A of a HE trigger based PPDU.

Referring to FIG. 17 (c), the User Information field may include at least one of an AID 12 subfield, a Resource Unit (RU) Allocation subfield, a Coding Type subfield, an MCS subfield, a Dual Sub-carrier Modulation (DCM) subfield, a Spatial Stream (SS) Allocation subfield, a Target RSSI subfield, a Reserved subfield, and a Trigger-Dependent Per User Info subfield. The AID 12 subfield indicates the LSB 12 bits of the AID of an STA that will receive the corresponding user information field. When the AID 12 subfield is 0 or 2045, it may indicate that the corresponding User Information field is allocated for an RU for random access. When the ADI 12 subfield is 4095, it may indicate that the Padding field starts in the trigger frame.

The Padding field may be optionally provided to the trigger frame. The Padding field extends the length of the trigger frame so that a recipient STA may be allowed to prepare for an SIFS response after receipt of the trigger frame. When provided, the Padding field has a length of two octets or longer which are set to all 1s.

FIG. 18 illustrates a User Information field of a trigger frame according to an embodiment of the present disclosure.

As described above, the AID 12 field of the User Information field of the trigger frame in FIG. 17 indicates the LSB 12 bits of the AID of an STA that will use resources allocated to the trigger frame.

Meanwhile, considering that the range of the current AID is 1 to 2007, an 11-bit AID field can sufficiently represent the values from 1 to 2007. Thus, as shown in the example of FIG. 18, the length of the AID 12 field in the User Information field of a trigger frame may be decreased by 1 bit, and more particularly, the AID 12 field may be reduced to an AID 11 field, and the rest 1 bit may be used for other purposes. For example, B0 to B10 indicate AID 11, and the remaining one bit, B11 corresponds to a reserved bit.

For example, when an AID is reduced using the AID 11 field, if the User Information field indicates trigger frame padding, 11 bits (B0 to B10) corresponding to the AID 11 field in the corresponding User Information field may be set to 2047. In the case of the AID 12 field, the start of padding may be indicated by setting the AID 12 field to 4095. However, in the case of the AID 11 field, the start of padding may be indicated by setting the AID 11 field to 2047.

Hereinafter, an example of configuring the Reserved field for the rest 1 bit (B11) will be described.

Example 1

Regardless of the value of AID 11, the Reserved field may be always set to 1. If the Reserved field for B11 is used for a different purpose, the Reserved field may be set to 0 exceptionally to indicate the corresponding purpose.

Example 2

Only when AID 11 is set to all 1s (i.e., 2047), the Reserved field may be set to 1. For example, when AID 11 is set to other values rather than 2047, the reserved field is set to 0.

Example 3

When AID 11 (i.e., [B0:B10]) is set to all 1s (i.e., 2047), trigger frame padding may be indicated regardless of the value of B11.

Network Allocation Vector (NAV)

A NAV may be interpreted as a timer for protecting a TXOP of a transmitting STA (e.g., TXOP holder). An STA may not perform channel access during a period in which the NAV configured for the STA is valid so as to protect a TXOP of another STA.

In the legacy WLAN system before 11ax, an STA supports one NAV. Upon receiving a valid frame, the STA may update the NAV with the Duration field of a PSDU (e.g., the Duration field of a MAC header). However, when the RA field of a received frame corresponds to the MAC address of the STA, the STA does not update the NAV. When the duration indicated by the Duration field of the received frame is greater than the current NAV value of the STA, the STA updates the NAV within the duration of the received frame.

Figure 19:
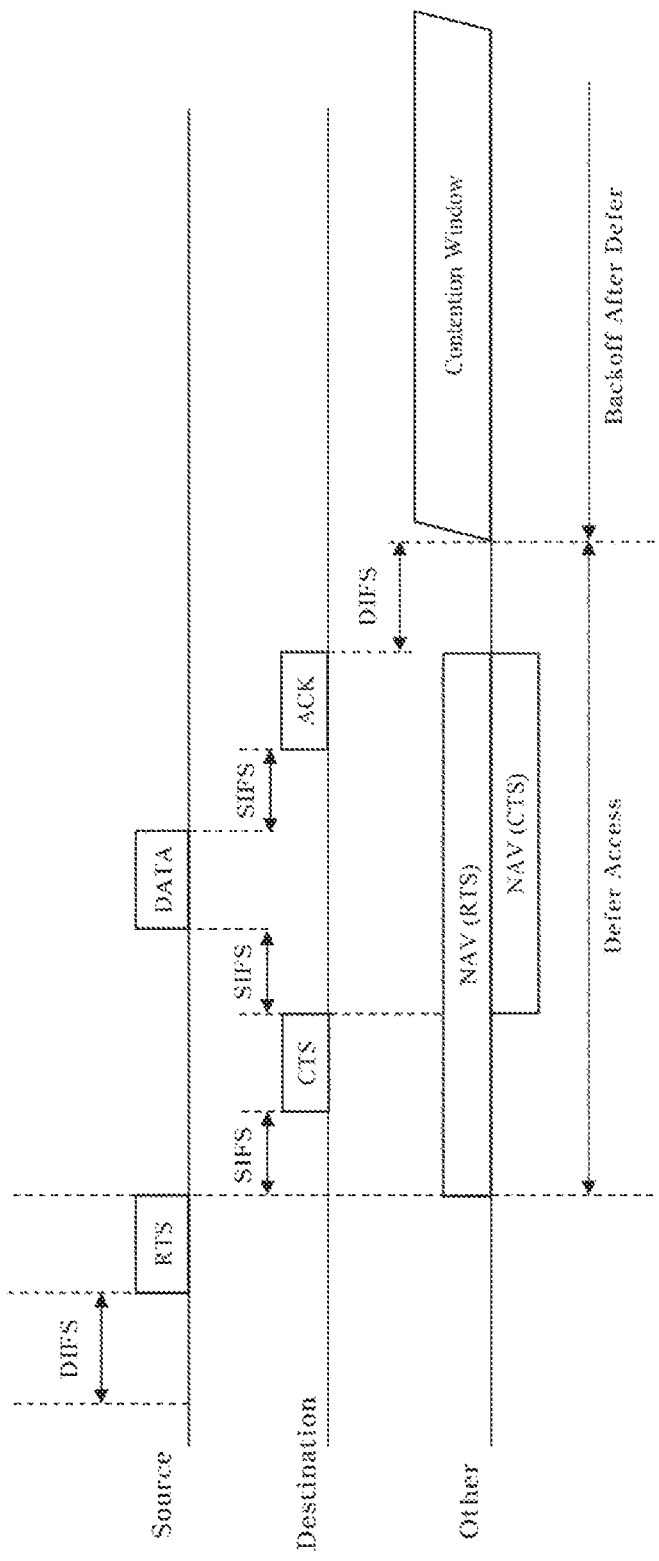
FIG. 19 illustrates NAV setting in the legacy WLAN system.

FIG. 19 illustrates NAV setting in the legacy WLAN system.

Referring to FIG. 19, a source STA transmits an RTS frame, and a destination STA transmits a CTS frame. As described above, the destination STA, which is designated as a recipient by the RTS frame, does not set a NAV. Some of other STAs may receive the RTS frame and set NAVs, and others may receive the CTS frame and set NAVs.

If the CTS frame (i.e., a PHY-RXSTART.indication primitive) is not received within a predetermined period from the time when the RTS frame is received (i.e., from the time when MAC receives a PHY-RXEND.indication primitive corresponding to the RTS frame), STAs which have set or updated NAVs through the RTS frame may reset the NAVs (e.g., 0). The predetermined period may be (2*aSIF-STime+CTS_Time+aRxPHYStartDelay+2*aSlotTime).

The CTS_Time may be calculated based on the length and data rate of the CTS frame indicated by the RTS frame.

Although FIG. 19 illustrates that a NAV is set or updated with an RTS frame or a CTS frame for convenience, NAV setting/resetting/update may be performed using Duration fields of various frames, for example, a non-HT PPDU, a HT PPDU, a VHT PPDU or a HE PPDU (e.g., the Duration field of the MAC header of a MAC frame). For example, if the RA field of a received MAC frame does not correspond to the address of an STA (e.g., MAC address), the STA may set/reset/update its NAV.

In the legacy WLAN system, TXOP duration is configured by the Duration field of the MAC header as described above. That is, a TXOP holder (e.g., Tx STA) and a TXOP responder (e.g., Rx STA) transmit and receive total TXOP information required for transmitting and receiving frames in the Duration field of a frame exchanged therebetween. Except the TXOP holder or the TXOP responder, third party STAs check the Duration field exchanged between the TXOP holder and the TXOP responder and defer use of a channel until the end of a NAV period by configuring/updating the NAV.

Meanwhile, in the 11 ax WLAN system, a non-AP STA manages two NAVs. The two NAVs may include an intra-BSS NAV and a basic NAV. The intra-BSS NAV is updated with an intra-BSS PPDU, and the basic NAV is updated with an inter-BSS PPDU or a PPDU which cannot be identified as either the intra-BSS PPDU or the inter-BSS PPDU. An AP may manage one or two NAVs. When the AP manages one NAV, the AP manages the NAV as in the legacy WLAN system.

BSS color information included in a HE SIG-A field may be used in determining whether a HE PPDU is the intra-BSS PPDU or the inter-BSS PPDU. Details of BSS color and intra-PPDU determination will be described later.

In the 11 ax system, a NAV may be updated not only with a MAC Duration field but also with a TXOP duration value included in the HE SIG-A field. However, if an STA obtains both the TXOP duration value and the MAC duration value (e.g., when the STA is capable of decoding both PHY/MAC), the STA updates its NAV based on the MAC duration value. If the TXOP duration value is set to 'unspecified' (e.g., all 1s), the STA does not update the NAV based on the corresponding TXOP duration value. In the 11 ax system, when an STA is a third party STA, the STA may update its NAV. In other words, the STA should not be a TXOP holder or responder. In particular, the STA may update its NAV only when the RA field of the MAC header of a received PPDU does not match with its MAC address.

If at least one of the two NAVs is non-zero, a HE STA determines that a medium is busy based on a virtual carrier sensing result and then defers channel access.

Determination of Intra-BSS Frame/Inter-BSS Frame

An STA determines that a corresponding PPDU is an inter-BSS frame if at least one of the following conditions is satisfied: (i) the BSS color in the received PPDU is not 0, and it is different from the BSS color of a BSS to which the STA belongs; (ii) the BSS color in the received PPDU is not 0, and the STA is a HE STA associated with a non-HE AP; (iii) the PPDU has the BSSID field, and the BSSID therein does not match with the BSSID of the BSS to which the STA belongs; (iv) the PPDU has no BSSID field, and both the RA and TA fields of the PPDU do not match with the BSSID of the BSS to which the STA belongs; and (v) the PPDU is a VHT PPDU, and the PAID included in the VHT PPDU does not match with a predetermined part of the BSSID (or BSS color) of the BSS to which the STA belongs.

The STA determines that the corresponding PPDU is an intra-BSS frame rather than the intra-BSS Frame: (i) the BSS color in the received PPDU is 0, or it is equal to the BSS color of the BSS to which the STA belongs; (ii) any one of the BSSID, RA, and TA fields of the PPDU matches with the BSSID of the BSS to which the STA belongs; (iii) the PPDU is a VHT PPDU, and the PAID included in the VHT PPDU matches with the predetermined part of the BSSID (or BSS color) of the BSS to which the STA belongs; (iv) the PPDU is a PPDU carrying a control frame and includes the RA field with no TA field, and the corresponding RA field matches with the TXOP holder address of the BSS to which the STA belongs.

If the PPDU does not belong to any one of the above cases, the STA may not determine whether the corresponding PPDU is the intra-BSS frame or the inter-BSS frame.

BSS Color

Figure 20:
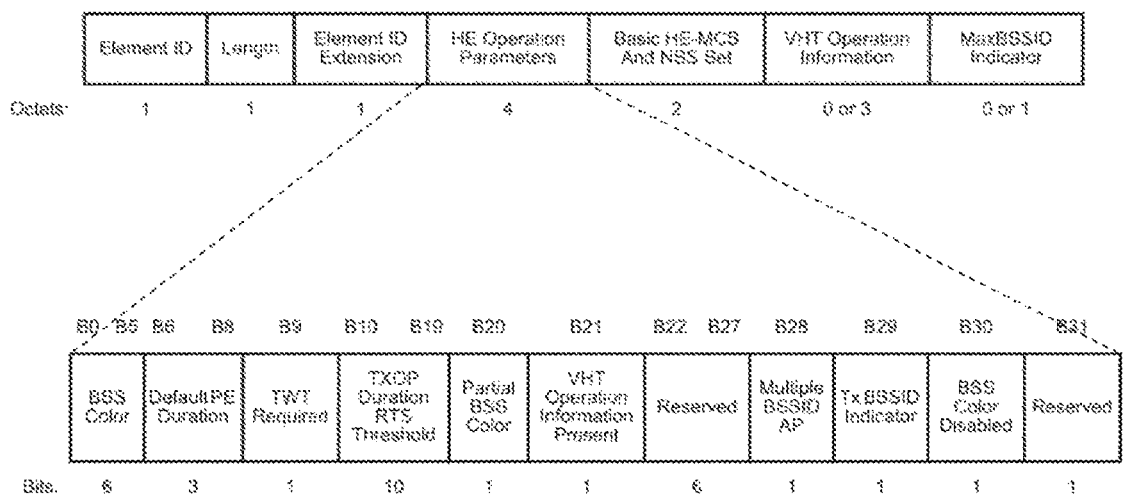
FIG. 20 illustrates a HE Operation element.

FIG. 20 illustrates a HE Operation element.

BSS color information may be transmitted in a HE Operation element included in an association response frame, a probe response frame, or a beacon frame. In addition, the HE Operation element may include not only a BSS Color subfield but also a BSS Color Disabled subfield. When the BSS Color Disabled subfield is set to 1, it indicates that an AP determines to disable the use of the BSS color. For example, the BSS color information of a BSS managed by the AP overlaps with the BSS color information of a neighboring BSS (e.g., BSS color collision), the AP may disable the use of the BSS color.

In the case of BSS color=0, it indicates that there is no BSS color for a corresponding BSS.

For example, the BSS color may be used for an intra-PPDU power save procedure, an intra-BSS NAV configuration, etc. However, when receiving the HE Operation element including the BSS Color Disabled subfield set to 1, an STA does not use BSS color information for the intra-PPDU power save procedure, the intra-BSS NAV configuration, etc. Instead, the STA may use information in the MAC header (e.g., RA/TA field).

Figure 21:
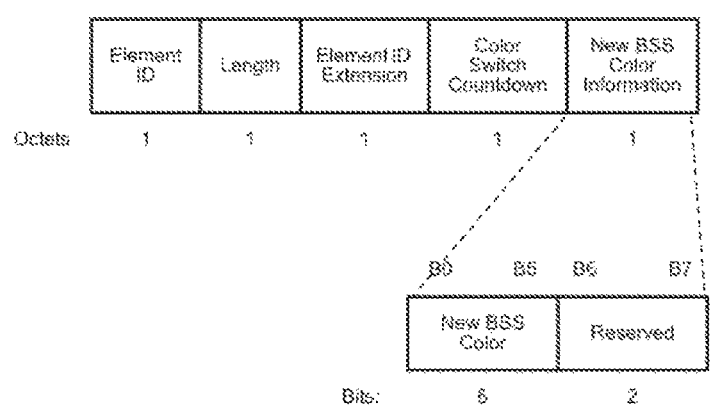
FIG. 21 illustrates a BSS Color Change Announcement element.

FIG. 21 illustrates a BSS Color Change Announcement element.

An AP may transmit information on BSS color change and new BSS color through a BSS Color Change Announcement element. A Color Switch Countdown field indicates the number of TBTTs that remain until the new BSS color is applied.

The BSS Color Change Announcement element may be included in a BSS Color Change Announcement frame, a beacon frame, a probe response frame, or an association response frame.

The AP may transmit the BSS Color Change Announcement element when there is a BSS color collision in an OBSS. The BSS Color Change Announcement element needs to be transmitted during a sufficiently long time since all STAs including STAs in PS mode should know the BSS color change. In the TBTT for the BSS color change, the AP sets the BSS Color Disabled subfield to 0 and starts using the new BSS color.

Extended Inter-Frame Space (EIFS) Operation

An STA that performs channel access (e.g., DCF) may use EIFS to determine whether a medium is idle after receiving a frame satisfying a specific condition. Hereinafter, the specific condition for using the EIFS is described. If the PHY-RXEND.indication primitive for a received frame has an error or if the FCS value for the received frame is not correct, an STA performs channel sensing using the EIFS before transmission. Similar to DCF, an STA's EDCA mechanism under HCF uses an interval of EIFS-DIFS+AIFS [AC]. Although the DCF is assumed for convenience of description, it will be understood by those skilled in the art that under the HCF, the EIFS-DIFS+AIFS [AC] length can be used instead of the EIFS.

In general, the EIFS length may correspond to DIFS+AckTxTim+SIFS. Regardless of a virtual CS mechanism, the EIFS interval starts after a PHY indicates that a medium is idle after detecting a frame with an error. The STA does not start transmission until both a NAV and the EIFS expires.

If the STA receives a frame with no error during the EIFS operation, the STA terminates the EIFS operation and resynchronize with the actual busy/idle state of the medium. If the EIFS expires or is terminated, the STA restores (or reverts to) the NAV and physical CS.

STA/AP Operation after BSS Color is Disabled

A description will be given of how an STA operates when BSS color is disabled. Although it is assumed that the BSS color is disabled when a BSS color collision occurs for convenience of description, the disclosure is not limited thereto. That is, the BSS color may be disabled due to other reasons.

An STA may apply intra-PPDU power save (PS) to a PPDU transmitted from a neighboring BSS when its BSS color is equal to that of the neighboring BSS. The intra-PPDU PS means a mode in which when an STA receives an intra-BSS PPDU, which is not intended for the corresponding STA (i.e., when the STA corresponds to a third party), the STA operates in a doze state until the end of the PPDU. That is, when a BSS collision occurs, if the STA misunderstands the PPDU from the neighboring BSS as an intra-BSS PPDU and then applies the intra-PPDU PS, the STA may miss a PPDU transmitted from an AP which the STA is associated with.

To solve the above problem, the AP may disable the use of the BSS color.

For example, when a BSS color collision occurs, the AP may inform STAs of the occurrence of the BSS color collision, using a beacon frame, etc. The BSS collision may be indicated by the above-described BSS Color Disabled subfield. Upon recognizing the BSS color collision from the beacon frame, an STA does not perform operation related to the BSS color (e.g., intra-PPDU PS, NAV setting, etc.)

Figure 22:
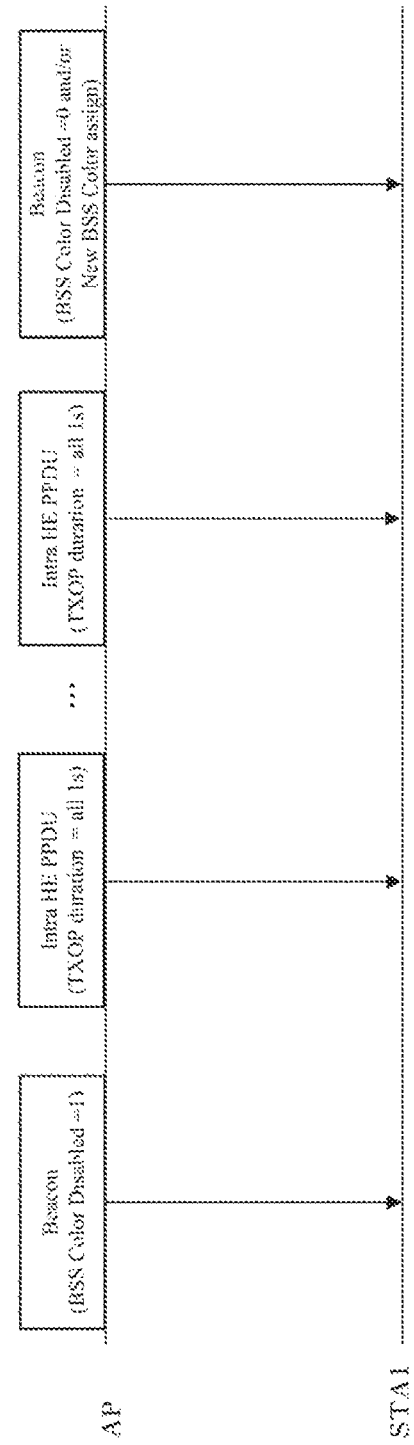
FIG. 22 illustrates an example of a method of transmitting and receiving a frame when BSS color is disabled.

FIG. 22 illustrates an example of a method of transmitting and receiving a frame when BSS color is disabled.

As described above, when a BSS color collision occurs, an AP selects a new BSS color and then informs STAs of the new BSS color using a beacon frame, etc. In this case, the AP provides information on the BSS color collision and the new BSS color during a sufficiently long time period to allow all STAs connected to the BSS to receive the new BSS color. HE STAs and APs that belong to the corresponding BSS and receive the beacon frame during a corresponding time period (i.e., before the new BSS color is applied) may set a TXOP Duration field in HE-SIG A to all 1s (e.g., unspecified states) when transmitting a HE PPDU.

When the TXOP Duration field of HE-SIG A is set to all 1s (i.e., 127), a HE STA does not perform the intra-PPDU PS even though the BSS color is an intra-BSS color and instead performs payload (e.g., PSDU) decoding to obtain MAC duration. In other words, when the TXOP Duration field is set to all 1s (e.g., 127), the STA does not enter the doze state of the intra-PPDU PS. Also, the STA does not update an intra-BSS NAV.

However, according to the method shown in FIG. 22, when OBSS STAs receive a PPDU including the TXOP Duration field set to all 1s, the OBSS STAs do not update NAVs with the TXOP Duration field. As a result, there may be a problem that the corresponding PPDU is not protected.

Meanwhile, there may be an STA that misses a beacon frame including the BSS Color Disabled subfield set to 1, and the corresponding STA may transmits a PPDU by setting the TXOP Duration field to another valid value rather than all 1s until obtaining the BSS Color Disabled subfield. In this situation, it should be defined whether a third party STA configures/updates a NAV with the TXOP Duration field if the third party STA receives the corresponding PPDU.

According to an embodiment of the present disclosure, when the BSS color is disabled, even if a third party STA receives an intra-BSS PPDU (e.g., a PPDU including its BSS color) having the TXOP Duration field not set to all 1s, the third party STA does not update an intra-BSS NAV based on the BSS color of the corresponding PPDU. In other words, when the BSS color is disabled, the third party STA does not update the intra-BSS PPDU using the TXOP Duration field even though the TXOP Duration field in the received intra-BSS PPDU is not all 1s. When the BSS color is disabled, the STA may determine whether to update the intra-BSS NAV using the A1/A2 field and a MAC duration value included in the MAC header rather than BSS color or TXOP duration values included in the HE-SIG-A field.

When the third party STA is unable to decode the MAC header, the third party STA may not obtain the A1/A2 field and MAC duration value. As a result, the third party STA may not determine whether to update the intra-BSS NAV based on the A1/A2 field and MAC duration value. When the BSS color is disabled, if the third party STA receives a PPDU including its BSS color and the TXOP Duration field not set to all 1s, the third party STA may update a basic NAV by regarding the PPDU as an unidentified PPDU since the BSS color is disabled.

Figure 23:
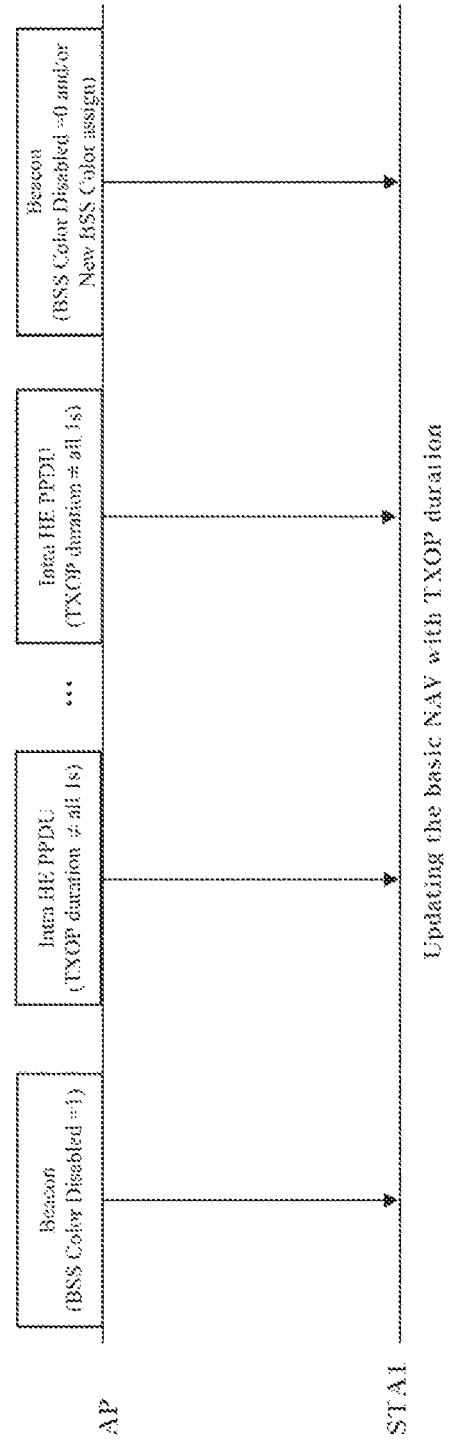
FIG. 23 illustrates another example of a method of transmitting and receiving a frame when BSS color is disabled.

FIG. 23 illustrates another example of a method of transmitting and receiving a frame when BSS color is disabled.

Referring to FIG. 23, after the BSS color is disabled, a HE STA (e.g., 3rd party) may receive an intra-PPDU including the TXOP Duration field set to a normal value (i.e., a value except all 1s).

Since the BSS color is disabled, the HE STA (e.g., 3rd party) cannot determine whether the PPDU is an intra-PPDU or an inter-PPDU, using the BSS color in the corresponding PPDU. Therefore, the HE STA (e.g., 3rd party) regards the corresponding PPDU as an unidentified PPDU and updates a basic NAV using the TXOP Duration field of the corresponding PPDU instead of updating an intra-BSS NAV.

In other words, an STA may regard a received frame as an intra-BSS frame when the following conditions are satisfied: the RXVECTOR parameter BSS_COLOR in a PPDU carrying the frame is the same as the BSS color announced by an AP which the STA is associated with; and the BSS Color Disabled subfield in the most recently received HE Operation element from the AP is 0 (i.e., the BSS color is enabled).

Accordingly, when the BSS Color Disabled subfield of the most recently received HE Operation element from the AP which the STA is associated with is set to 1, the STA does not regard the corresponding PPDU as the intra-BSS frame even though the RXVECTOR parameter BSS_COLOR of the received PPDU is equal to the BSS color of the AP which the STA is associated with. That is, the STA does not update the intra-BSS NAV. Instead, the STA updates the basic NAV with a RXVECTOR TXOP_DURATION field of the received PPDU by regarding the corresponding PPDU as the unidentified PPDU.

Figure 24:
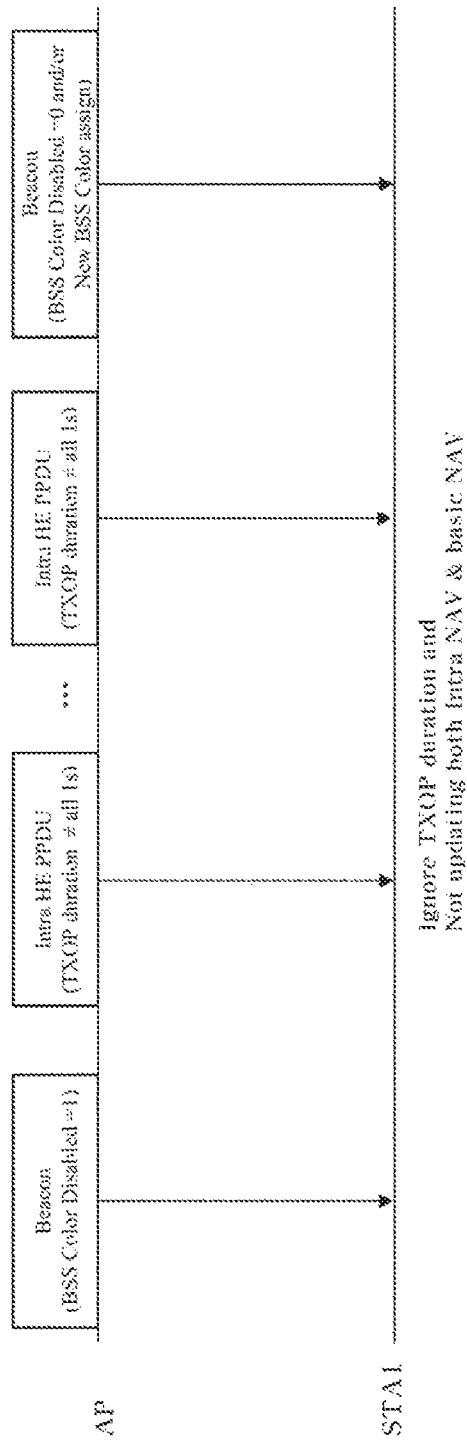
FIG. 24 illustrates a further example of a method of transmitting and receiving a frame when BSS color is disabled.

FIG. 24 illustrates a further example of a method of transmitting and receiving a frame when BSS color is disabled.

As described above, when the BSS color is disabled, if a third party STA receives a PPDU including the TXOP Duration field not set to all 1s (i.e., TXOP Duration field all 1s) (i.e., 127 in a size of 7 bits, UNSPECIFIED) and is unable to decode the MAC header of the PPDU (for example, when the third part STA is unable to obtain the A1/A2/MAC Duration field), the third party STA updates a basic NAV with the TXOP duration field≠all 1s (i.e., 127 in a size of 7 bits, UNSPECIFIED) even though the BSS color in the PPDU is the same as its BSS color. However, according to another embodiment of the present disclosure, the third party STA may invoke the EIFS in the same situation, instead of updating the basic NAV.

Referring to FIG. 24, when the BSS color is disabled, if a HE STA receives an intra-PPDU (if the BSS color in the received PPDU is the same as the BSS color of its AP, the received PPDU is regarded as a BSS color based intra-PPDU), the HE STA does not update both an intra-BSS NAV and a basic NAV with the TXOP Duration field. That is, the HE STA ignores the value of the TXOP Duration field. In addition, when the HE STA is unable to decode the MAC data payload of the received PPDU (for example, when the HE STA is unable to decode the A1/A2/Duration field in the MAC header), the HE STA invokes the EIFS operation.

When the BSS color is disabled (BSS Color Disabled subfield=1), the EIFS may be invoked even though a valid TXOP_DURATION parameter is included in RXVECTOR of the received PPDU. In this case, the valid TXOP_DURATION parameter means that since the TXOP Duration field is not all 1s (e.g., all 1s=unspecified), TXOP_DURATION indicates a duration value.

As described above, in the legacy WLAN system, the EIFS is invoked when a frame has an error. In particular, when the PHY-RXEND.indication primitive for a received frame (or PPDU) contains an error or when the FCS value for the frame is not correct, the EIFS may be used.

However, according to an embodiment of the present disclosure, when the BSS color is disabled, even if the PHY-RXEND.indication primitive contains no error and the FCS value for a frame is correct, the EIFS may be invoked by reason that a PPDU having the TXOP Duration field≠all 1s is received.

As another example, when the BSS color is disabled, the reception of the PPDU having the TXOP Duration field≠all 1s may be defined as a new type of error for invoking the EIFS. For example, when the BSS color is disabled, if the PPDU having the TXOP Duration field all 1s is received, the PHY-RXEND.indication primitive may be configured to indicate an error. Thus, an STA may invoke the EIFS on the basis of the corresponding error.

However, when a valid TXOP_Duration parameter is included in RXVECTOR of the received PPDU and the BSS Color Disabled subfield included in the most recently received HE Operation element from an AP which the STA is associated with is set to 0, the EIFS is not invoked.

According to an embodiment of the present disclosure, when the BSS color is disabled, the conditions for invoking the EIFS when an inter-BSS HE PPDU is received may be different from those when an intra-BSS HE PPDU is received.

For example, when an STA receives an inter-BSS HE PPDU including a valid RXVECTOR parameter TXOP_DURATION, the STA does not invoke the EIFS regardless of the value of the BSS Color Disabled subfield.

When the STA receives an intra-BSS HE PPDU including a valid RXVECTOR parameter TXOP_DURATION, the STA does not invoke the EIFS if the BSS Color Disabled subfield is 0.

However, if the BSS Color Disabled subfield is 1, the STA may invoke the EIFS even though the STA receives the intra-BSS HE PPDU including the valid RXVECTOR parameter TXOP_DURATION. For example, the EIFS may be invoked for a frame with an incorrect FCS. However, for an intra-BSS PPDU including a frame having one or more correct FCSs (MPDU), the EIFS is not invoked.

In other words, when RXVECTOR of the received inter-BSS HE PPDU has the valid TXOP_DURATION parameter (i.e., not all 1s) or when RXVECTOR of the received intra-BSS HE PPDU has the valid TXOP_DURATION parameter (i.e., not all 1s), if the BSS Color Disabled subfield of the most recently received HE Operation element from the AP which the STA is associated with is 0, the EIFS is not invoked. If there are no other causes, for example, conventional EIFS invocation causes (e.g., an incorrect FCS, an unsupported rate, a PHY error such as format violation, etc.), the EIFS is not invoked at least due to the valid TXOP_DURATION parameter.

When the STA receives the inter/intra-BSS HE PPDU including the RXVECTOR parameter TXOP_DURATION set to all 1s, the STA may use the EIFS as in the legacy WLAN.

According to an embodiment of the present disclosure, an STA may update an intra-BSS NAV with duration information indicated by the RXVECTOR parameter TXOP_DURATION when all of the following conditions are satisfied: (i) the RXVECTOR parameter TXOP_DURATION is not set to all 1s (the RXVECTOR parameter TXOP_DURATION≠all 1s); (ii) a PPDU carrying information of the RXVECTOR parameter is recognized as an intra-BSS and the BSS Color Disabled subfield of the most recently received HE Operation element from an AP which the STA is associated with is 0; (iii) the duration information indicated by the RXVECTOR parameter TXOP_DURATION is greater than the current intra-BSS NAV of the STA; and (iv) the PPDU carrying the information of the RXVECTOR parameter is not a HE trigger based PPDU, which is triggered by the corresponding STA.

According to an embodiment of the present disclosure, when the PHY-RXEND.indication primitive for a corresponding frame has an error or when the FCS value for the corresponding frame is not correct, if the BSS Color Disabled subfield of the most recently received HE Operation element from an AP which a HE-STA is associated with is 0, the DCF of the STA may receive a frame satisfying a specific condition and use the EIFS before transmitting its frame to determine whether a medium is idle.

In addition, when the RXVECTOR parameter of a received HE PPDU includes a valid TXOP_DURATION parameter and when the BSS Color Disabled subfield of the most recently received HE Operation element from the AP which the STA is associated with is 0, the EIFS is not invoked.

Hereinafter, a method of terminating EIFS according to an embodiment of the present disclosure will be described. The application of the EIFS termination method, which will be described in the following, is not limited to the EIFS operation initiated by the aforementioned EIFS invocation causes. That is, the EIFS termination method is also applicable to the EIFS operation performed by other causes.

In the legacy WLAN system, the EIFS is terminated if an error-free frame is received during the EIFS. According to an embodiment of the present disclosure, the EIFS termination is not limited when the error-free frame is received, and the EIFS may be terminated when a specific HE PPDU is received during the EIFS.

According to an embodiment of the present disclosure, if a corresponding STA correctly decodes a PHY preamble and obtains TXOP duration in the HE-SIG A field, the STA may terminate the EIFS based on the TXOP duration even though there is an error in MAC of a PPDU received during the EIFS (for example, when there is an incorrect FCS).

For example, when the most recently received HE Operation element from an AP which an STA that performs the EIFS operation is associated with contains the BSS Color Disabled subfield set to 0, if the STA receives an intra-BSS PPDU including a valid RXVECTOR parameter TXOP_DURATION, the STA may terminate the EIFS to resynchronize with the actual busy/idle state of a medium and continue access to the medium. In the case of a HE STA with two NAVs, the HE STA reverts to its intra-BSS NAV when terminating the EIFS. Alternatively, the HE STA with the two NAVs may revert to both the intra-BSS NAV and inter-BSS NAV when terminating the EIFS. In the case of a HE STA with one NAV (e.g., AP STA), the HE STA may revert to the corresponding one NAV when terminating the EIFS. The valid RXVECTOR parameter TXOP_DURATION may mean that the RXVECTOR parameter TXOP DURATION indicates a duration value since the TXOP Duration field is not set to all 1s.

if the STA receives an inter-BSS PPDU including a valid RXVECTOR parameter TXOP_DURATION during the EIFS operation, the STA may terminate the EIFS to resynchronize with the actual busy/idle state of a medium and continue access to the medium. In the case of a HE STA with two NAVs, the HE STA reverts to its inter-BSS NAV when terminating the EIFS. Alternatively, the HE STA with the two NAVs may revert to both the intra-BSS NAV and inter-BSS NAV when terminating the EIFS. In the case of a HE STA with one NAV (e.g., AP STA), the HE STA may revert to the corresponding one NAV when terminating the EIFS.

if the STA receives an inter-BSS PPDU or intra-BSS PPDU including an invalid RXVECTOR TXOP_DURATION parameter, the STA does not terminate the EIFS.

As another example, when the most recently received HE Operation element from an AP which an STA that performs the EIFS operation is associated with contains the BSS Color Disabled subfield set to 1, if the STA receives an intra-BSS PPDU including a valid RXVECTOR TXOP_DURATION parameter, the STA does not terminate the EIFS.

if the STA receives an inter-BSS PPDU including a valid RXVECTOR TXOP_DURATION parameter, the STA may terminate the EIFS to resynchronize with the actual busy/idle state of a medium and continue access to the medium. In the case of a HE STA with two NAVs, the HE STA reverts to its inter-BSS NAV when terminating the EIFS. Alternatively, the HE STA with the two NAVs may revert to both the intra-BSS NAV and inter-BSS NAV when terminating the EIFS. In the case of a HE STA with one NAV (e.g., AP STA), the HE STA may revert to the corresponding one NAV when terminating the EIFS.

if the STA receives an inter-BSS PPDU or intra-BSS PPDU including an invalid RXVECTOR TXOP_DURATION parameter, the STA does not terminate the EIFS.

When an inter-BSS PPDU includes a valid TXOP_DURATION parameter, an STA may terminate the EIFS regardless of the value of the BSS Color Disabled subfield.

When an inter-BSS HE PPDU including a valid TXOP_DURATION parameter is received during the EIFS or EIFS-DIFS+AIFS [AC] or an intra-BSS HE PPDU including a valid TXOP_DURATION parameter is received during the EIFS or EIFS-DIFS+AIFS [AC], if the BSS Color Disabled subfield in the most recently received HE Operation element from an AP which an STA is associated with is 0, the STA may terminate the EIFS or EIFS-DIFS+AIFS [AC] to resynchronize with the busy/idle state of a medium and continue access to the medium (e.g., DIFS, AIFS, or a backoff process if necessary). At the expiration or termination of the EIFS or EIFS-DIFS+AIFS [AC], a HE STA with two NAVs reverts to either or both of its intra-BSS NAV or inter-BSS NAV and physical CS for controlling the access to the medium.

For example, when the BSS color is not disabled (i.e., when the BSS Color Disabled subfield in the most recently received HE Operation element from an AP to which an STA is associated with is 0), if the STA receives a HE PPDU (e.g., intra-BSS/inter-BSS HE PPDU) including a valid TXOP_DURATION parameter during the EIFS or EIFS-DIFS+AIFS [AC], the corresponding STA may terminate the EIFS. In this case, the STA may invoke the EIFS or EIFS-DIFS+AIFS [AC] operation when the STA receives a frame including a valid TXOP duration value in the state that that BSS color disabled as described above. However, the STA may also invoke the EIFS or EIFS-DIFS+AIFS [AC] operation based on other reasons, for example, by reason that the PHY-RXEND.indication primitive for a received frame has an error or the FCS value for the received frame is incorrect.

Figure 25:
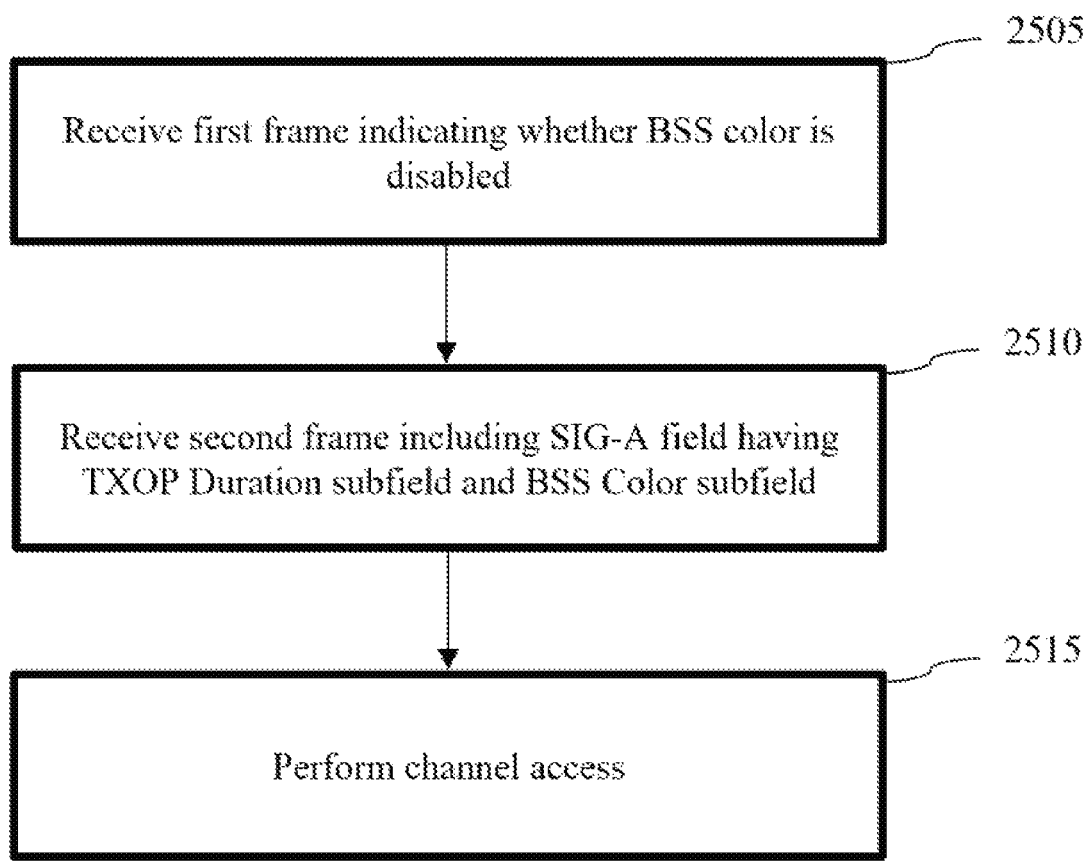
FIG. 25 is a flowchart illustrating a channel access method according to an embodiment of the present disclosure.

FIG. 25 is a flowchart illustrating a channel access method according to an embodiment of the present disclosure. Redundant description will be omitted.

Referring to FIG. 25, an STA receives, from an AP, a first frame indicating whether BSS color is disabled (2505). The first frame may include the HE Operation element, and whether the BSS color is disabled may be indicated by the BSS Color Disabled subfield. The first frame may be a beacon frame, a probe response frame, or an association (or re-association) response frame, but the present disclosure is not limited thereto.

The STA receives a second frame including the SIG-A field having the TXOP Duration subfield and the BSS Color subfield (2510). The second frame may be transmitted from another STA not shown in the drawing.

For convenience, the STA is assumed to be a third party STA for a second STA.

The STA performs channel access (2515). When the BSS Color subfield of the second frame includes a disabled BSS color and the TXOP Duration subfield of the second frame includes a valid TXOP duration value (for example, when the TXOP Duration field is not all 1s) even though the first subframe indicates that the BSS color is disabled, the STA may perform the channel access by invoking the EIFS operation. For example, when the STA is unable to obtain MAC data from the second frame including the disabled BSS color and the valid TXOP duration value, the STA may invoke the EIFS operation.

The STA may not update a NAV with the corresponding valid TXOP duration value by ignoring the valid TXOP duration value of the second frame including the disabled BSS color.

When the BSS color is disabled, the STA includes an invalid TXOP duration value (e.g., all 1s) in a frame transmitted by the STA.

When the BSS Color subfield of the second frame corresponds to an inter-BSS frame including another BSS color, the STA may not invoke the EIFS by reason that the second frame includes the valid TXOP duration value.

When the STA receives a third frame including another valid TXOP duration value during the EIFS operation, the STA may terminate the EIFS operation and resynchronize with the actual busy/idle state of a medium. At the termination of the EIFS operation, the STA may revert to either or both an intra-BSS NAV and a basic NAV. For example, if the third frame is an inter-BSS frame, the STA may terminate the EIFS operation and reverts to the basic NAV. On the contrary, if the third frame is an intra-BSS frame, the STA may continue the EIFS operation.

Figure 26:
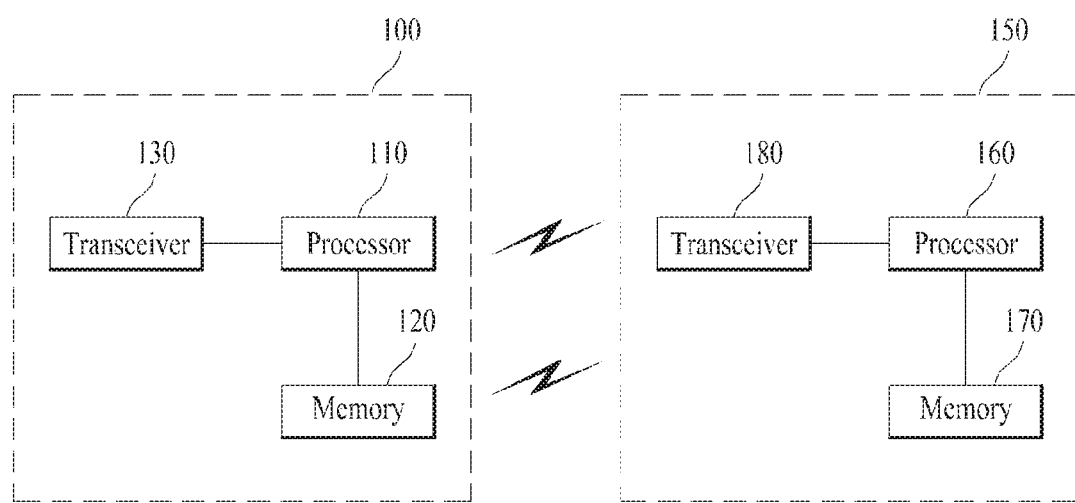
FIG. 26 is a diagram for explaining a device according to an embodiment of the present invention.

FIG. 26 is an explanatory diagram of apparatuses for implementing the aforementioned method.

A wireless device 100 and a wireless device 150 in FIG. 26 may correspond to the aforementioned STA/AP 1 and STA/AP 2, respectively.

The STA 100 may include a processor 110, a memory 120, and a transceiver 130 and the AP 150 may include a processor 160, a memory 170, and a transceiver 160. The transceivers 130 and 180 may transmit/receive a wireless signal and may be implemented in a physical layer of IEEE 802.11/3GPP. The processors 110 and 160 are implemented in a physical layer and/or a MAC layer and are connected to the transceivers 130 and 180. The processors 110 and 160 may perform the above-described UL MU scheduling procedure.

The processors 110 and 160 and/or the transceivers 130 and 180 may include an Application-Specific Integrated Circuit (ASIC), a chipset, a logical circuit, and/or a data processor. The memories 120 and 170 may include a Read-Only Memory (ROM), a Random Access Memory (RAM), a flash memory, a memory card, a storage medium, and/or a storage unit. If an example is performed by software, the above-described method may be executed in the form of a module (e.g., a process or a function) performing the above-described function. The module may be stored in the memories 120 and 170 and executed by the processors 110 and 160. The memories 120 and 170 may be located at the interior or exterior of the processors 110 and 160 and may be connected to the processors 110 and 160 via known means.

The detailed description of the preferred examples of the present invention has been given to enable those skilled in the art to implement and practice the invention. Although the invention has been described with reference to the preferred examples, those skilled in the art will appreciate that various modifications and variations can be made in the present invention without departing from the spirit or scope of the invention described in the appended claims. Accordingly, the invention should not be limited to the specific examples described herein, but should be accorded the broadest scope consistent with the principles and novel features disclosed herein.

INDUSTRIAL APPLICABILITY

The present invention can be applied to various wireless communication systems including IEEE 802.11.

What is claimed is:

1. A method of performing channel access by a station (STA) in a wireless local area network (WLAN) system, the method comprising:
   receiving, from an access point (AP), a first frame indicating whether basic service set (BSS) color is disabled;
   receiving a second frame including a Signal-A (SIG-A) field having a Transmission Opportunity (TXOP) Duration subfield and a BSS Color subfield; and
   performing the channel access,
   wherein when the BSS Color subfield of the second frame includes a disabled BSS color and the TXOP Duration subfield of the second frame includes a valid TXOP duration value even though the first subframe indicates that the BSS color is disabled, the STA performs the channel access by invoking an extended inter-frame space (EIFS) operation.

2. The method of claim 1, wherein when the STA is unable to obtain medium access control (MAC) data from the second frame including the disabled BSS color and the valid TXOP duration value, the STA invokes the EIFS operation.

3. The method of claim 1, wherein the STA does not update a network allocation vector (NAV) with the valid TXOP duration value by ignoring the valid TXOP duration value of the second frame including the disabled BSS color.

4. The method of claim 1, wherein when the BSS color is disabled, the STA includes an invalid TXOP duration value in a frame transmitted by the STA,
   and wherein when the BSS Color subfield of the second frame corresponds to an inter-BSS frame including another BSS color, the STA does not invoke the EIFS by reason that the second frame includes the valid TXOP duration value.

5. The method of claim 1, wherein when the STA receives a third frame including another valid TXOP duration value during the EIFS operation, the STA terminates the EIFS operation and resynchronizes with an actual busy/idle state of a medium.

6. The method of claim 5, wherein at the termination of the EIFS operation, the STA reverts to either or both an intra-BSS network allocation vector (NAV) and a basic NAV.

7. The method of claim 6, wherein when the third frame is an inter-BSS frame, the STA terminates the EIFS operation and reverts to the basic NAV.

8. The method of claim 7, wherein when the third frame is an intra-BSS frame, the STA continues the EIFS operation.

9. A station (STA) comprising:
a transceiver; and
a processor configured to control the transceiver to receive, from an access point (AP), a first frame indicating whether basic service set (BSS) color is disabled, receive a second frame including a Signal-A (SIG-A) field having a Transmission Opportunity (TXOP) Duration subfield and a BSS Color subfield, and perform channel access,
wherein when the BSS Color subfield of the second frame includes a disabled BSS color and the TXOP Duration subfield of the second frame includes a valid TXOP duration value even though the first subframe indicates that the BSS color is disabled, the STA performs the channel access by invoking an extended inter-frame space (EIFS) operation.

10. The STA of claim 9, wherein when the processor is unable to obtain medium access control (MAC) data from the second frame including the disabled BSS color and the valid TXOP duration value, the processor is configured to invoke the EIFS operation.

11. The STA of claim 9, wherein the processor is configured not to update a network allocation vector (NAV) with the valid TXOP duration value by ignoring the valid TXOP duration value of the second frame including the disabled BSS color.

12. The STA of claim 9, wherein when the BSS color is disabled, the processor is configured to include an invalid TXOP duration value in a frame transmitted by the processor, and
wherein when the BSS Color subfield of the second frame corresponds to an inter-BSS frame including another BSS color, the processor is configured not to invoke the EIFS by reason that the second frame includes the valid TXOP duration value.

13. The STA of claim 9, wherein when a third frame including another valid TXOP duration value is received during the EIFS operation, the processor is configured to terminate the EIFS operation and resynchronize with an actual busy/idle state of a medium.

14. The STA of claim 13, wherein at the termination of the EIFS operation, the processor is configured to revert to either or both an intra-BSS network allocation vector (NAV) and a basic NAV.

15. The STA of claim 14, wherein when the third frame is an inter-BSS frame, the processor is configured to terminate the EIFS operation and revert to the basic NAV, and
wherein when the third frame is an intra-BSS frame, the processor is configured to continue the EIFS operation.

* * * * *